US008348450B2

(12) United States Patent
Hebenstreit et al.

(10) Patent No.: US 8,348,450 B2
(45) Date of Patent: Jan. 8, 2013

(54) BOOK LIGHT FOR ELECTRONIC BOOK READER DEVICES

(75) Inventors: Joseph J. Hebenstreit, San Francisco, CA (US); Wilfrido Loor Canizares, San Francisco, CA (US); Amrinder Pal Singh Siani, Union City, CA (US); Hannah Rebecca Lewbel, Campbell, CA (US)

(73) Assignee: Amazon Technologies, Inc., Reno, NV (US)

( * ) Notice: Subject to any disclaimer, the term of this patent is extended or adjusted under 35 U.S.C. 154(b) by 246 days.

(21) Appl. No.: 12/683,945

(22) Filed: Jan. 7, 2010

(65) Prior Publication Data

US 2011/0164410 A1 Jul. 7, 2011

(51) Int. Cl.
*F21V 33/00* (2006.01)
*A47B 19/00* (2006.01)

(52) U.S. Cl. ............ 362/109; 362/85; 362/98; 206/320

(58) Field of Classification Search .................... 362/98, 362/99, 109; 715/776; 361/679.01, 679.55–679.58, 361/679.27, 679.28; 206/305, 320, 701, 206/722, 725; 281/51; 150/165
See application file for complete search history.

(56) References Cited

U.S. PATENT DOCUMENTS 4,680,681 A * 7/1987 Fisherman et al. ............ 362/98
5,280,416 A * 1/1994 Hartley et al. .................. 362/98
5,417,575 A 5/1995 McTaggart
5,442,528 A * 8/1995 Vandenbelt ..................... 362/98
5,460,414 A * 10/1995 Sargis ............................ 281/51
6,533,431 B2 * 3/2003 Leifer et al. ................. 362/109
6,799,861 B2 * 10/2004 Naghi et al. .................. 362/198
6,805,459 B1 * 10/2004 Prescott et al. ................ 362/99
6,851,822 B2 * 2/2005 Herrera ........................... 362/99
7,618,065 B2 * 11/2009 Yau ......................... 361/679.56
7,854,319 B2 * 12/2010 Yau ............................. 206/320
8,047,670 B2 11/2011 Patrick et al.
8,186,843 B2 * 5/2012 Mish et al. ..................... 362/98
2003/0086256 A1 * 5/2003 Ip ................................... 362/98

(Continued)

FOREIGN PATENT DOCUMENTS

WO WO 9412076 A1 * 6/1994

OTHER PUBLICATIONS

Biba, P. "Review: Periscope Lighted Portfolio for Kindle 2", Jul. 22, 2009, retrieved from the internet Feb. 18, 2011 <<http://www.teleread.com/paul-biba/review-periscope-lighted-portfolio-for-kindle-2>> 5 pages.

(Continued)

*Primary Examiner* — Alan Cariaso
(74) *Attorney, Agent, or Firm* — Lee & Hayes, PLLC

(57) ABSTRACT

A dedicated electronic book ("eBook") reader device and a reading light are described. The reading light may be embedded in a cover for the eBook reader device. The cover may draw power from the eBook reader device and provide that power to the reading light. The reading light may be attached to the cover by a flexible connector that, when withdrawn from the cover, automatically positions the reading light to illuminate an electronic display of the eBook reader device. In one implementation, the flexible connector is made of shape-memory alloy. The reading light may be oriented within the cover such that the reading light extends from a corner of the cover at an approximately 45 degree angle from a spine of the cover.

23 Claims, 5 Drawing Sheets

U.S. PATENT DOCUMENTS

| | | | | |
|---|---|---|---|---|
| 2004/0017677 | A1* | 1/2004 | Krietzman | 362/85 |
| 2005/0063697 | A1 | 3/2005 | Tsai et al. | |
| 2006/0017887 | A1 | 1/2006 | Jacobson et al. | |
| 2008/0049416 | A1 | 2/2008 | Fisherman et al. | |
| 2008/0232098 | A1 | 9/2008 | Nelson et al. | |
| 2008/0266835 | A1* | 10/2008 | Chang | 362/98 |
| 2010/0103380 | A1 | 4/2010 | Destain | |
| 2011/0193788 | A1 | 8/2011 | King et al. | |
| 2011/0307842 | A1 | 12/2011 | Chiang et al. | |

OTHER PUBLICATIONS

Translated PCT Search Report mailed Mar. 3, 2011 for PCT Application No. PCT/US10/61991, a counterpart foreign application for U.S. Appl. No. 12/683,945.

Gizmodo, Nook Reading Light, retrieved on Oct. 27, 2009 at <http://gizmodo.com/5381149/bn-reader-gal//galery/3>, 1 page.

Lumatec, Everest Computer Instruction Manual, retrieved on Sep. 16, 2009 at <<http://www.lumatec.com/download/manuals/ev160_manual.pdf >>, 1 pg.

Lumatec, Everest Mini Instruction Manual, retrieved on Sep. 16, 2009 at <<http://www.lumatec.com/download/manuals/ev110_manual.pdf>>, 1 pg.

Lumatec, Reading Light, retrieved on Sep. 14, 2009 at <<http://www.lumatec.com/reading/ev__150.htm>>, 1 pg.

Lyra Light, Barnes & Noble—retrieved on Oct. 27, 2009 at <http://gifts.barnessandmoble.com/Lyra-Light/e/9781599859439/?cds2Pid=30255>, 4 pages.

Non-Final Office Action for U.S. Appl. No. 12/827,061, mailed on May 8, 2012, john T. Kim et al., "Optical Assembly for Electronic Devices", 13 pages.

* cited by examiner

BOOK LIGHT FOR ELECTRONIC BOOK READER DEVICES

BACKGROUND

A large and growing population of users is enjoying entertainment through the consumption of digital media items, such as electronic books on electronic book ("eBook") reader devices. eBook reader devices typically employ reflective displays to reduce eye strain and to reduce power consumption. However, in low-light conditions, viewing the display of an eBook reader device may be difficult because the display does not include a light source. In contrast, computer monitors and displays of many portable electronic devices are backlit which enables these displays to be read in low-light conditions because the display is itself a light source.

Users of eBook reader devices and other portable electronic devices may wish to use these devices in situations where ambient light sources (e.g., the sun, lamps) are unavailable or would disturb others (e.g. reading in bed or in an airplane). As the popularity and prevalence of eBook reader devices increases, users of eBook reader devices may be on average less "computer savvy" than a typical computer user. Accordingly, usability considerations for eBook reader devices may emphasize ease of use and intuitive design more than such considerations are emphasized for other electronic devices. Also, the portability of eBook reader devices could be hampered by requiring a user to carry numerous accessories in order to realize the full functionality (i.e. use in low-light conditions) of an eBook reader device.

Thus, there is a need for enabling use of eBook reader devices in low-light conditions in a manner that is intuitive to use and does not require carrying numerous accessories with the eBook reader devices.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

This disclosure is directed towards a reading light for a dedicated handheld electronic book ("eBook") reader device. The eBook reader device is designed to allow users to read or otherwise consume electronic content (e.g., text, graphics, multimedia, and the like), such as that found in eBooks, magazines, RSS feeds, newspapers, and the like.

The reading light is configured to illuminate an electronic display of the eBook reader device, and particularly, to enable viewing of the display in low-light conditions. In the implementations described herein, the reading light may be embedded in a cover for the eBook reader device or within a housing of the eBook reader device itself.

While specific light sources, power sources, and placement of the reading light are described herein, it is noted that potentially other types of light sources, power sources, and/or placements may be utilized to enable viewing of the display of the eBook reader device in low-light conditions. Accordingly, the discussion of specific implementations of a reading light in this disclosure may equally apply to other implementations that may be used in conjunction with the eBook reader device.

Illustrative eBook Reader Device and Cover

Figure 1:
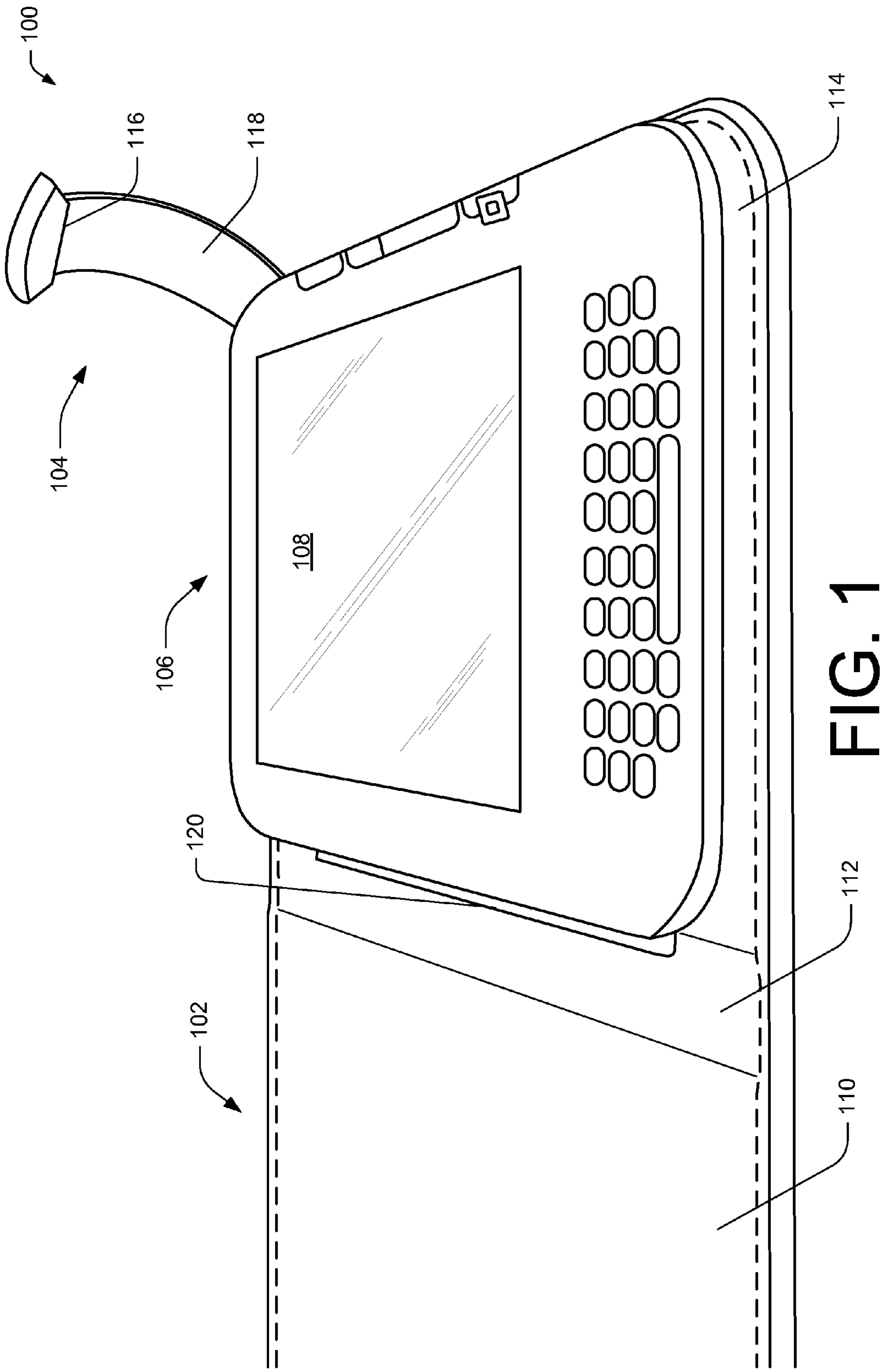
FIG. 1 shows a perspective view of a dedicated handheld electronic book ("eBook") reader device and a cover for the eBook reader device that includes a reading light.

FIG. 1 illustrates a perspective view 100 in which a cover 102 with a reading light 104 is coupled to an eBook reader device 106 to enable viewing of an electronic display 108 of the device 106 in low-light conditions. The cover 102 includes a front cover panel 110, a spine 112, and a back cover panel 114. The reading light 104 may include a light source 116 and a flexible connector 118 that joins the light source to the cover.

The cover 102 may be physically affixed to the device 106 by a connection mechanism 120. The connection mechanism 120 may include such things as an adhesive, a hook-and-loop fastener, elastic straps, magnetism, clips, hooks, etc. The connection mechanism 120 is shown in this illustration on the spine 112. In other implementations, the connection mechanism 120 may be located, for example, on an inside surface of the back cover panel 114 or other places on the cover 102. In some implementations, the cover 102 may be formed as a sleeve into which the device 102 is placed. In such implementations, the cover 104 may lack a discrete connection mechanism 120 because the cover 102 itself functions as the connection mechanism 120 by surrounding the device 102.

The connection mechanism 120 may further facilitate an electrical connection as well as a physical connection. For example, the connection mechanism 120 may create a physical-electrical connection that carries electrical current for powering the reading light 104 as well as connecting the cover 102 to the device 106.

In one implementation, the connection mechanism 120 may not supply power to the cover 102. In this implementation, power for the reading light 104 may be provided by a battery embedded in the cover 102 or an external power source such as an external battery or power cord.

Although the illustrative examples provided herein described the reading light 104 as part of a cover 102 for the device 106, the reading light 104 described in this disclosure may also be embedded directly into a housing of the device 106. In this implementation, the reading light 104 is present even when the cover 102 is not coupled to the device 106.

Figure 2:
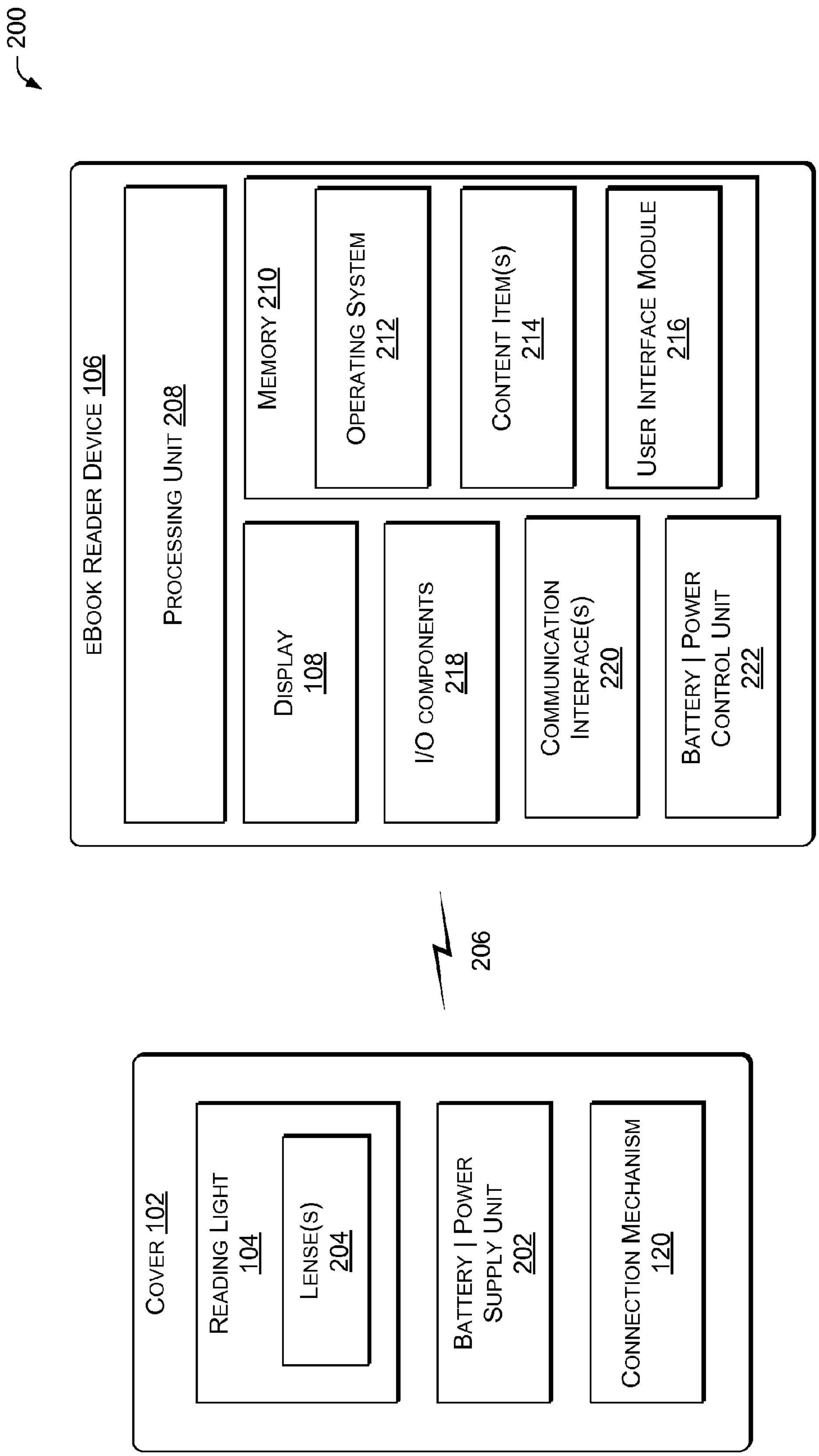
FIG. 2 is a block diagram showing components that may be implemented in subsystems of the cover and subsystems of the eBook reader device.

FIG. 2 illustrates exemplary components 200 that might be implemented in the cover 102 and the device 106. Functional components that might be implemented in the cover 102 include the reading light 104, the connection mechanism 120, and a battery/power supply unit 202. The reading light 104 may also include lens(es) 204 to direct illumination from the light source 116 over the display 108. In some implementations, the lens(es) 204 may comprise fiber optic cables or the tips thereof. The battery/power supply unit 202 may provide electrical power from a battery or from any external source such as a power cord. The connection mechanism 120 creates a coupling 206 between the cover 102 and the device 106. As discussed above, this coupling 206 may be a physical-electrical coupling between the cover 102 and the device 106. In some implementations, the coupling 206 may provide an optical connection between the cover 102 and the device 106 for carrying light to illuminate the display 108 or provide optical data. In this manner, power from the device 106 may be supplied to the light source 116 through the coupling 206, making the battery/power supply unit 202 optional. Alternatively, the coupling 206 may simply be a physical coupling. In some implementations, the physical coupling and the electrical coupling may be performed by separate mechanisms (e.g., hooks provide a physical coupling and exposed electrical connectors mate when the cover 102 is coupled to the device 106 forming an electrical coupling).

The device 106 may be equipped with an electronic display 108 to display electronic documents, such as electronic books or "eBooks". The terms "book" and/or "eBook", as used herein, include electronic or digital representations of printed works, as well as digital content that may include text, multimedia, hypertext, and/or hypermedia. Examples of printed and/or digital works include, but are not limited to, books, magazines, newspapers, periodicals, journals, reference materials, telephone books, textbooks, anthologies, instruction manuals, proceedings of meetings, forms, directories, maps, web pages etc. Accordingly, the terms book and/or eBook may include any visual content that is in electronic or digital form.

In a very basic configuration, the device 106 includes a processing unit 208 composed one of one or more processors, and a memory 210. The memory 210 is an example of computer storage media and may include volatile and nonvolatile memory. Thus, the memory 210 may include, but is not limited to, RAM, ROM, EEPROM, flash memory, or other memory technology, or any other medium which can be used to store media items or applications and data which can be accessed by the device 106.

The memory 210 may be used to store any number of functional components that are executable on the processing unit 208, as well as data that are rendered by the device 106. For example, the memory 210 may store an operating system 212 and one or more content items 214, such as eBooks. The memory 210 may further include a memory portion designated as an immediate page memory to temporarily store one or more pages of an eBook. The pages held by the immediate page memory are placed therein a short period before a next page request is expected.

The term "page," as used herein, refers to a collection of content that is presented at one time in the display 108 of the eBook reader device 102. Thus, a "page" may be understood as a virtual frame of the content, or a visual display window presenting the content to the user. Thus, "pages" as described herein are not fixed permanently, in contrast to the pages of published "hard" books. Instead, pages described herein may be redefined or repaginated when, for example, the user chooses a different font for displaying the content in the first display. In addition to pages, the terms "page views", "screen views", and the like are also intended to mean a virtual frame of content.

A user interface module 216 may also be provided in memory 210 and executed on the processing unit 208 to facilitate user operation of the device 106. The user interface module 216 may provide menus and other navigational tools to facilitate selection and rendering of the content items 214. The user interface module 216 may further include a browser or other application that facilitates access to sites over a network, such as websites or online merchants.

The device 106 further includes one or more electronic displays 108. In one implementation, the display uses ePaper display technology, which is bi-stable, meaning that it is capable of holding text or other rendered images even when very little or no power is supplied to the display. The electronic display 108 may also be a reflective display without a backlight that is illuminated by ambient light sources external to the display. Some exemplary displays that may be used with the implementations described herein include bi-stable LCDs, MEMS, cholesteric, pigmented electrophoretic, and others. The display 108 may be embodied using other technologies, such as LCDs and OLEDs. In some implementations, the display 108 may further include a touch screen interface.

In other implementations, the device 106 may include a second display that is positioned adjacent the reflective display. The second display may be embodied using a different display technology, with a different (e.g., faster) refresh rate. For instance, the second display may be embodied as LCD, OLED, or other type of display technologies. Such displays also enable color presentations and graphical user interfaces. Further, any one of the displays may include touch technology to enable a touch screen user interface so that users may enter commands through touch or non-contact gestures.

The device 106 may further be equipped with various input/output (I/O) components 218. Such components may include various user interface controls (e.g., buttons, joystick, keyboard, etc.), audio speaker, connection ports, and so forth. One or more communication interfaces 220 may also be provided to facilitate communication with external, remote computing sources over various networks, such a network or with other than a local device. Content (e.g., eBooks, magazines, audio books, etc.), as well as program modules, may be transferred to the device 106 via the communication interfaces(s) 220. The communication interface(s) 220 may support both wired and wireless connection to various networks, such as cellular networks, radio, WiFi networks, short range networks (e.g., Bluetooth), IR, and so forth. For example, the device 106 may be equipped with an antenna that may function as a radio frequency transceiver to facilitate wireless communication over a wireless network.

The device 106 may also include a battery/power control unit 222. The battery/power control unit operatively controls an amount of power, or electrical energy, consumed by the device 106. Actively controlling the amount of power consumed by the device 106 may achieve more efficient use of electrical energy stored by the battery 222. In some implementations, power from the battery/power control unit 222 is provided to the cover 102 which in turn supplies power to the reading light 104. The power control unit 222 may further include a clock/timer for accurate control of power consumed by the device 106.

The eBook reader device 102 may have additional features or functionality. For example, the eBook reader device 102 may also include additional data storage devices (removable and/or non-removable) such as, for example, magnetic disks, optical disks, or tape. The additional data storage media may include volatile and nonvolatile, removable and non-removable media implemented in any method or technology for storage of information, such as computer readable instructions, data structures, program modules, or other data.

Illustrative Reading Light

Figure 3:
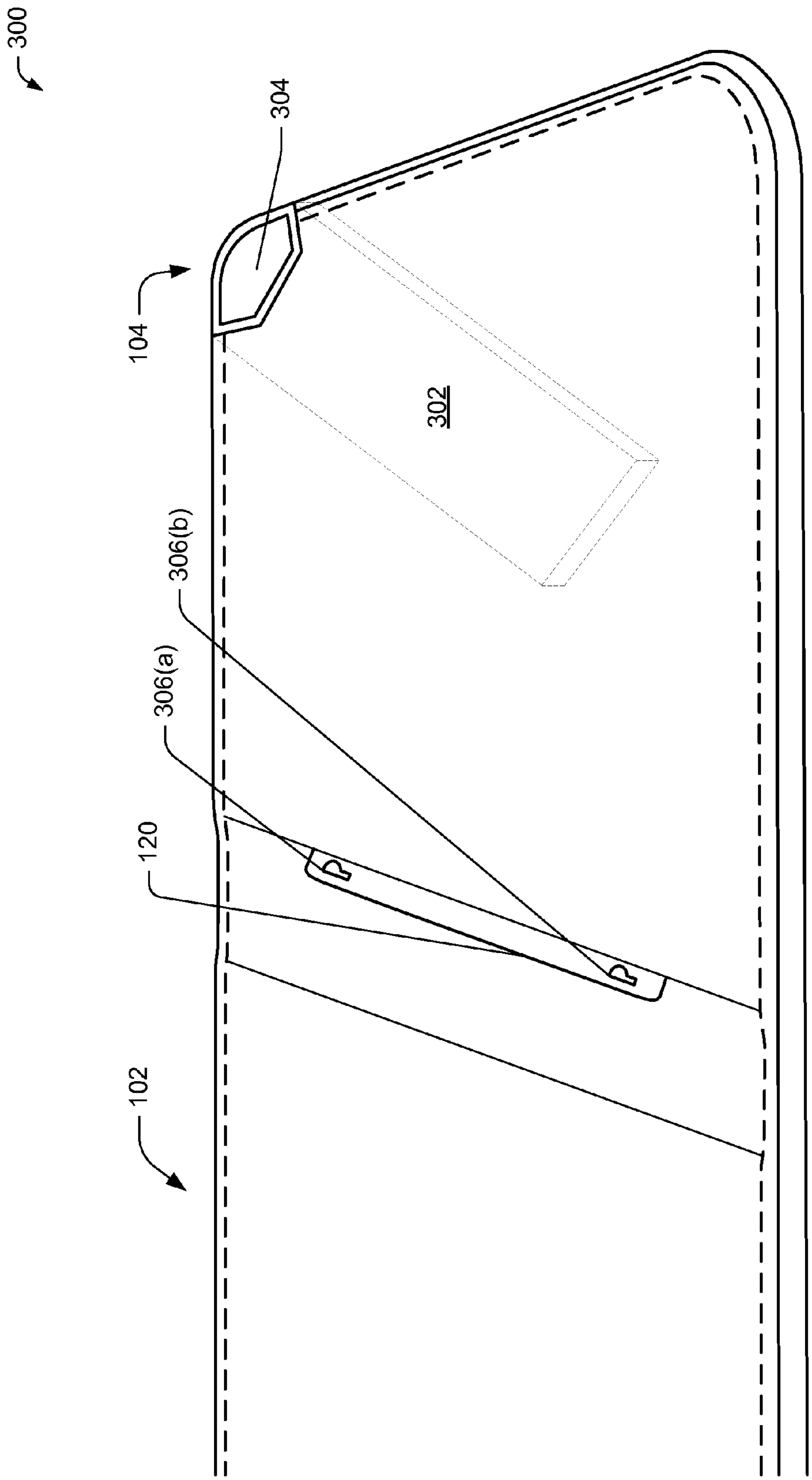
FIG. 3 shows a perspective view of the cover with the reading light fully inserted into the cover.

FIG. 3 illustrates a perspective view 300 of the cover 102 with the reading light 104 fully inserted into the cover 102. In this illustration, the device 106 is omitted to better illustrate the features of the retractable reading light 104. In one implementation, the reading light 104 is sufficiently thin to be concealed within the cover 102 when not in use. The reading light 104 may occupy a sleeve, a pocket, or the like 302 within the cover 102. When fully inserted into the cover 102, an end of the reading light may remain exposed. The end of the reading light may have a gripping surface 304 for a user to grasp in order to withdraw the reading light 104 from the cover 102. For example, the user may grab the exposed, gripping surface 304 with a thumb and index finger, and then pull the reading light 104 out from the cover 102. In some implementations, the end of the reading light forms a seal with the cover 102 when the reading light 104 is fully inserted into the cover 102. This seal can prevent contaminants from entering the cover 102 when the reading light 104 is not in use.

In one implementation, the reading light 104 may be completely concealed within the cover 102 when not in use. In this implementation, the light source 116 may be a coating on the flexible connector 118 (e.g., electroluminescent film). In some implementations this coating could comprise a flexible organic light-emitting diode. When completely concealed within the cover 102 the reading light 104 would not have an exposed, gripping surface 304. Movement of the reading light 104 into and out of the cover 102 may be actuated by a slider mechanism (not shown), for example, a slider exposed on an outside surface of the cover 102.

The perspective view 300 also shows one implementation of the connection mechanism 120. In this implementation, the connection mechanism 120 may be one or more hooks 306. For example, two hooks 306(*a*) and 306(*b*) may be used to couple the cover 102 to the device 106. Each hook 306(*a*), 306(*b*) may be electrically conductive, with one of the two hooks 306(*a*) carrying a positive current while the other hook 306(*b*) carries a negative current. Alternatively, a single electrically-conductive hook 306, providing a single current path, may contain a plurality of conductors insulated from one another. For example, a top conductive layer may be separated from a bottom conductive layer by an insulator, forming two conductive pathways. Alternately, a non-conductive hook 306, or a hook 306 coated with an insulator, may have a plurality of conductive traces on a surface of the hook 306.

As discussed above, power supplied to the cover 102 by the hooks 306, or other connection mechanism 120, may be provided to the reading light 104 by wiring or other electronics (not shown) within the cover 102.

Figure 4:
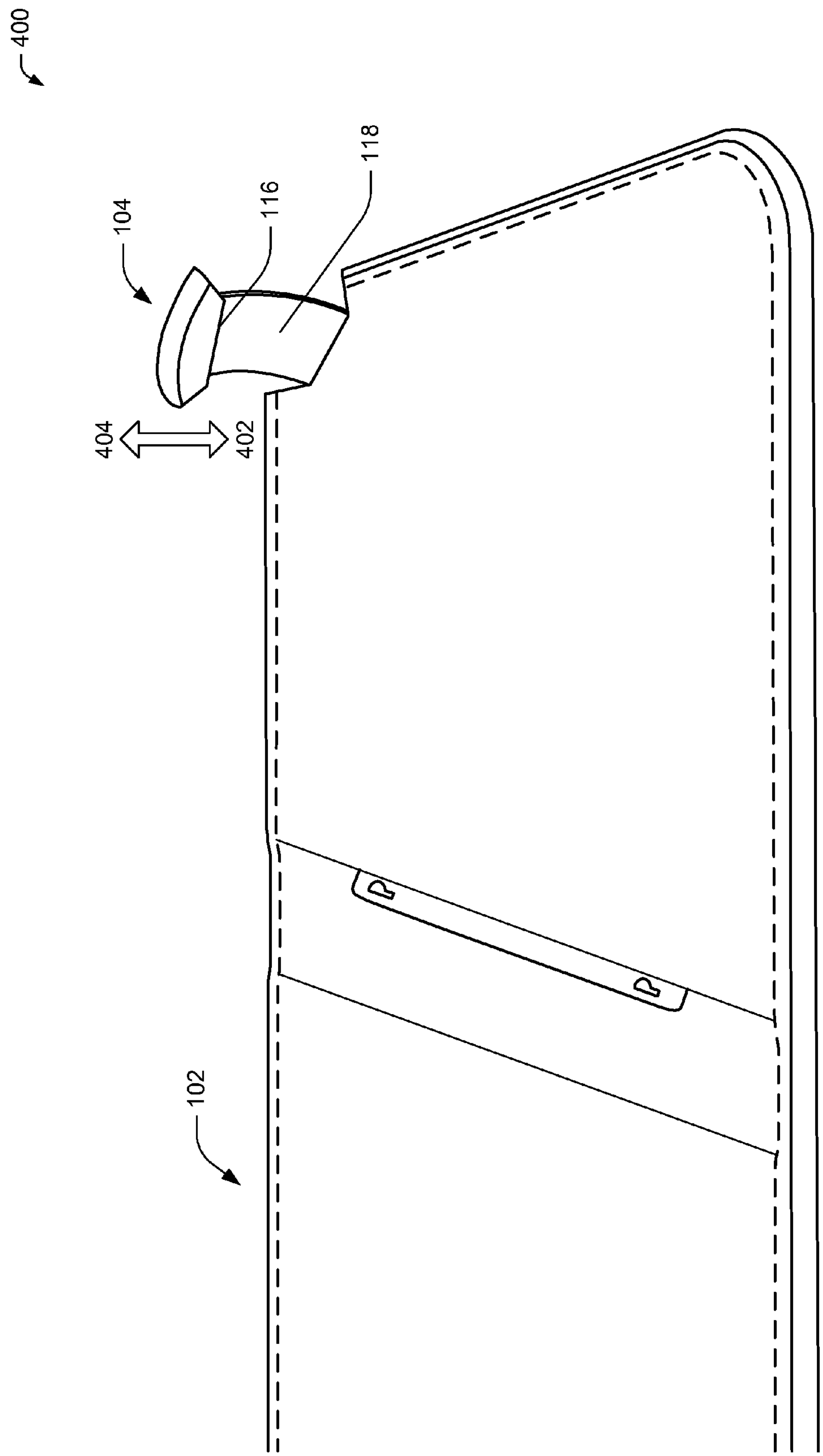
FIG. 4 shows a perspective view of the cover with the reading light partially withdrawn from the cover.
Figure 5:
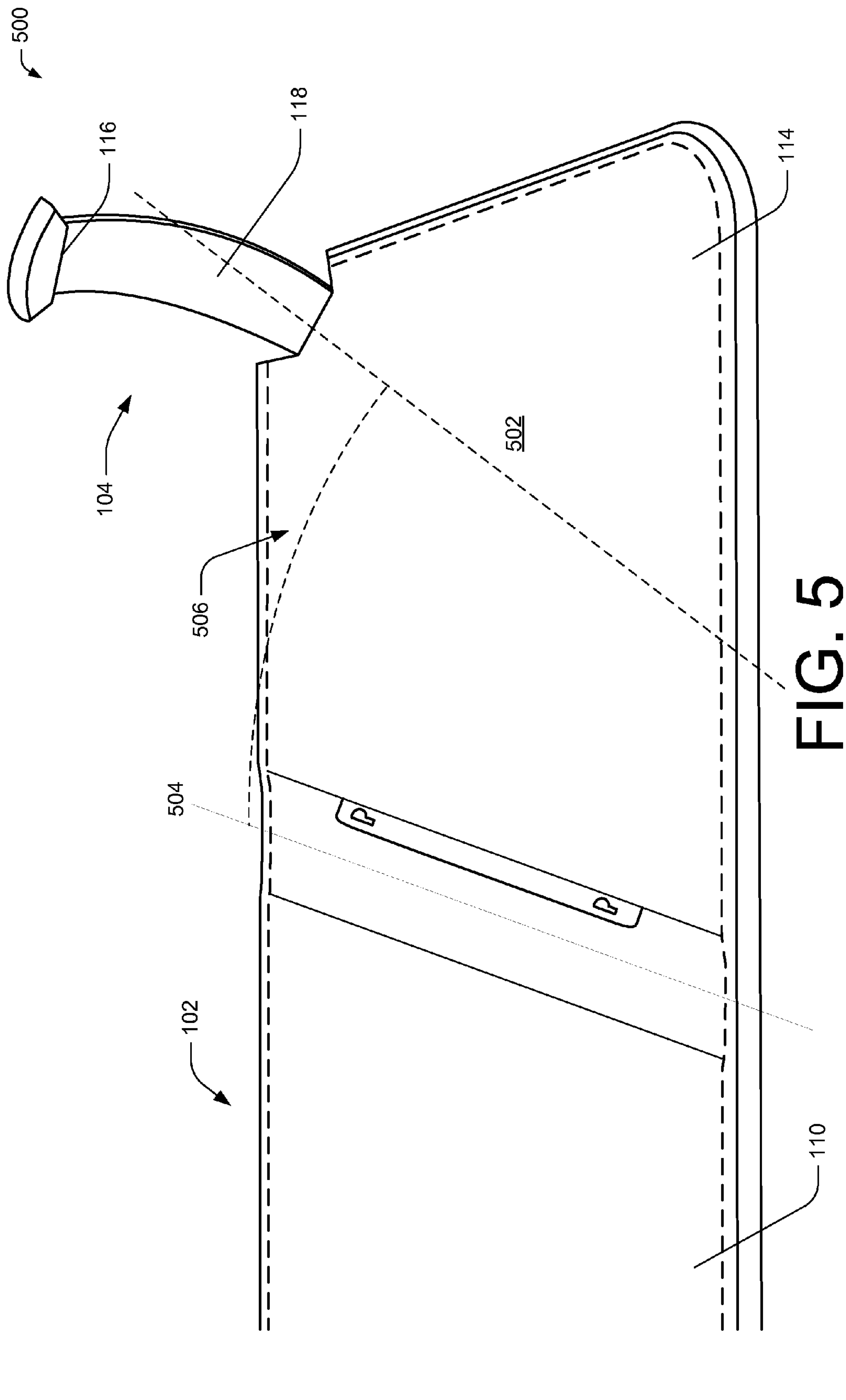
FIG. 5 shows a perspective view of the cover with the reading light fully withdrawn from the cover.

FIG. 4 is shows a perspective view 400 of the reading light 104 partially withdrawn from the cover 102. In some implementations, a strength of illumination provided by the light source 116 may change depending on a distance that the reading light 104 is withdrawn from the cover 102. For example, when the reading light 104 is fully inserted into the cover 102, as shown in FIG. 3, the reading light 104 may be automatically turned off. When the reading light 104 is halfway withdrawn from the cover as shown in FIG. 4, the light source 116 may provide illumination that is about half of a maximum illumination. When the reading light 104 is fully withdrawn from the cover 102 (as shown in FIG. 5), the strength of illumination provided by the light source 116 may be at maximum illumination. In this implementation, the light source 116 is configured to provide a greater strength of illumination in proportion to the distance that the reading light 104 is withdrawn from the cover 102. This mechanism for adjusting the illumination strength of the light source 116 enables the user to dim the light source 116 simply by slightly inserting 402 the reading light 104 into the cover 102. Conversely, if the light source 116 is not at maximum strength, the user can brighten the light source 116 by withdrawing 404 the reading light 104 slightly farther from the cover 102.

A mechanism in the cover 102 may detect a distance that the reading light 104 is withdrawn from the cover 102 and adjust the illumination strength of the light source 116 accordingly. In some implementations, the mechanism may be a variable resistor coupled to the flexible connector 118 or alternatively coupled to an inside surface of the sleeve 302. In other implementations, a mechanical sensor such as a rotatable wheel is moved as the reading light 104 is withdrawn from or inserted into the cover 102 thereby generating a signal which may be used to adjust the illumination strength of the light source 116. Alternate mechanisms for correlating a position of the reading light 104 to the illumination strength of the light source 116 are also envisioned.

The light source 116 may include, but is not limited to, an incandescent filament, a solid-state light-emitting diode, an organic light-emitting diode, an organic light-emitting diode film, or an electroluminescent film. In some implementation, the light source 116 may be a fiber optic element. In this implementation, the light may be initially generated by a bulb, light-emitting diode, or the like within the cover 102 and optically transmitted to the light source 116 by fiber optics. In related implementations, the light may be initially generated within the device 106 and optically transmitted to the cover 104 which in turn transmits the light through fiber optics to the light source 116. The light may be transmitted through the coupling 206 described above. In implementations where the reading light 104 is embedded in the device 106 itself, light may be transmitted though fiber optics that extend from a housing of the device 106 in an arc configured to direct the light onto the screen 108.

The particular light source 116 selected for a given application may be based upon considerations of size, electrical consumption, ability to generate illumination of varying intensities, and flexibility. Small and/or flexible light sources 116 may be more suitable for insertion into the cover 102. Light sources 116 that are efficient at producing light with small amounts of electricity may help to increase the amount of time a user can use the reading light 104 before depleting a battery. The reading light 104 may also include lenses 204 to direct the illumination from the light source 116 over the display 108. In some implementations, the lenses 204 may diffuse light produced from the light source 116 to avoid hotspots on the display 108 and/or to evenly distribute the light over the display 108.

FIG. 5 is shows a perspective view 500 of the reading light 104 fully withdrawn from the cover 102. When fully withdrawn from the cover 102, a geometry of the reading light 104 may allow the cover 102 to be closed while the reading light 102 is extended. The flexibility in the shape of the flexible connector 118 may create the geometry that allows the cover 102 to be closed when the reading light 102 is fully withdrawn from the cover.

The flexible connector 118 may be constructed from materials including, but not limited to, a high-yield strength metal, a superelastic material, a polypropylene material, and a shape-memory alloy. Shape-memory alloy includes spring steel, smart metal, memory alloy, smart alloy, alloys of copper-zinc-aluminum-nickel, alloys of copper-aluminum-nickel, alloys of nickel-titanium, and other materials having the properties generally associated with shape-memory alloys. In some implementations, the flexible connector 118 may lie flat within the cover when retracted and automatically curl over the display 108 when slid out of the cover 102 to position the light source 116 to illuminate the display 108 of the device 106. For example, if the flexible connector 118 is constructed from shape-memory alloy, the shape-memory alloy may automatically change from a flat shape when inserted into the cover 102 to a curved shape when withdrawn from the cover 102. While the flexible connector 118 is illustrated herein as a flat strip of material, the flexible connector 118 may also take other forms such as a wire or tube.

In one implementation, the flexible connector 118 may also supply power to the light source 116. For example, if the flexible connector 118 is constructed from an electrically-conductive alloy or metal, the flexible connector 118 itself can carry electricity to the light source 116. In this implementation, the light source 116 may be selected such that the strength of an electric current flowing through the flexible connector 118 is not perceivable to a user touching the flexible connector 118. In other implementations, power may be supplied to the light source 116 by mechanisms including, but not limited to, a separate wire running from the cover 102 to the light source 116, electrically conductive traces along the surface of the flexible connector 118, wires inside a hollow chamber (e.g., in a tube) of the flexible connector 118, and the like.

FIGS. 1 and 3-5 show an illustrative example in which the reading light 104 is located in a top, outside corner of the back cover panel 114. In other implementations, that reading light 104 may be situated differently, for example the reading light 104 may be located on other corners of the cover 104, along an edge of the cover 104, or along the spine 112. The reading light 104 may be situated in the cover 102 such that when the cover 102 is coupled to the device 106, the reading light 104 does not block or interfere with the antenna of the device 106.

In the illustrative example shown in FIGS. 1 and 3-5, an axis 502 along which the reading light 104 moves when withdrawn from or inserted into the cover 102 is not parallel to an axis 504 defined by the spine 112. The angle 506 formed by the reading-light axis 502 and the spine axis 504 is approximately 45° in the illustrative examples. More generally, the angle 506 may be between approximately 22° and 68°.

Although the cover 102 including the reading light 104 is described herein as adapted for coupling to an eBook reader device 106, the cover 102 may also be adapted for coupling to other electronic devices or to non-electronic devices such as a book or a notepad.

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A cover for a dedicated electronic book reader device, the cover comprising:
- a physical-electrical coupling located on an inside surface of the cover and configured to connect the cover to the device and to provide power to the cover from the device; and
- a reading light configured to slide into the cover when not in use and slide out of the cover to illuminate a bi-stable, reflective, un-backlit, electronic display of the device, the reading light comprising:
  - a light-emitting diode light source;
  - a shape-memory alloy connector physically joining the light source to the cover and providing power to the light source from the cover, the shape-memory alloy configured to lie flat within the cover when inserted into the cover and automatically curl over the display when withdrawn from the cover; and
  - a gripping surface configured to slide the reading light into or out of the cover responsive to a user pushing or pulling on the gripping surface, the gripping surface remaining exposed when the reading light is inserted into the cover.

2. The cover of claim 1, wherein the physical-electrical coupling comprises an electrically-conductive hook.

3. The cover of claim 1, wherein the physical-electrical coupling is located on a spine of the cover.

4. The cover of claim 1, wherein the reading light slides into a corner of the cover at an angle of about 45° relative to a spine of the cover.

5. The cover of claim 1, wherein the light source is configured to provide a greater strength of illumination in proportion to a distance that the reading light is withdrawn from the cover.

6. A cover for a dedicated electronic book reader device, the cover comprising:
- a physical-electrical coupling configured to connect the cover to the device and to provide power to the cover from the device; and
- a reading light configured to slide into the cover when not in use and slide out of the cover to illuminate an electronic display of the device, the reading light comprising:
  - a light source;
  - a flexible connector physically joining the light source to the cover and providing power to the light source from the cover; and
  - a gripping surface configured to slide the reading light into or out of the cover responsive to a user pushing or pulling on the gripping surface, the gripping surface remaining exposed when the reading light is inserted into the cover.

7. The cover of claim 6, wherein the physical-electrical coupling is located on an inside surface of a spine of the cover.

8. The cover of claim 6, wherein the reading light inserts into a corner of the cover at an angle different than an axis defined by a spine of the cover.

9. The cover of claim 6, wherein the light source of the reading light is oriented to illuminate a display comprising a bi-stable, non-backlit, reflective display region and a backlit display region, the light source oriented to predominantly illuminate the reflective display region.

10. The cover of claim 6, wherein the light source comprises an incandescent filament, a solid-state light-emitting diode, an organic light-emitting diode, an organic light-emitting diode film, or an electroluminescent film.

11. The cover of claim 6, wherein the light source comprises an internal light source configured to supply illumination via fiber optics to a region of the flexible connector distal from the cover.

12. The cover of claim 6, wherein a strength of illumination provided by the light source depends on a distance that the reading light is withdrawn from the cover.

13. The cover of claim 6, wherein the flexible connector comprises a high-yield strength metal, a superelastic material, a polypropylene material, or a shape-memory alloy.

14. The cover of claim 6, wherein the flexible connector comprises a shape-memory alloy configured to lie flat within the cover when inserted and automatically curl over the electronic display when withdrawn from the cover.

15. A cover for a dedicated electronic book reader device, the cover comprising:
- a front cover panel;
- a back cover panel;
- a spine; and
- a reading light configured to slide into and out of a corner of the front cover panel or back cover panel at an angle different than an axis defined by the spine, the reading light illuminating an electronic display of the device when slid out of the cover.

16. The cover of claim 15, wherein the back cover panel is configured to couple the device to the cover.

17. The cover of claim 15, wherein the spine is configured to couple the device to the cover.

18. The cover of claim 15, wherein the reading light is configured to slide into and out of a top, outside corner of the back cover panel.

19. The cover of claim 15, wherein the angle is between approximately 22° and 68°.

20. The cover of claim 15, wherein the angle is approximately 45°.

21. The cover of claim 15, wherein the reading light comprises:

a light source;

a flexible connector joining the light source to the cover; and a gripping surface configured to slide the reading light into or out of the cover responsive to a user pushing or pulling on the gripping surface.

22. The cover of claim 21, wherein the flexible connector is configured to lie flat when inserted into the cover and automatically curl over the display when withdrawn from the cover.

23. The cover of claim 21, wherein at least a portion of the gripping surface remains exposed at a corner of the cover when the reading light is inserted into the front cover panel or the back cover panel.

* * * * *